Oct. 30, 1962  H. E. CROSSLEY, JR  3,061,823
DIFFERENTIAL PRESSURE TRANSMITTER
Filed Sept. 13, 1957  5 Sheets-Sheet 4
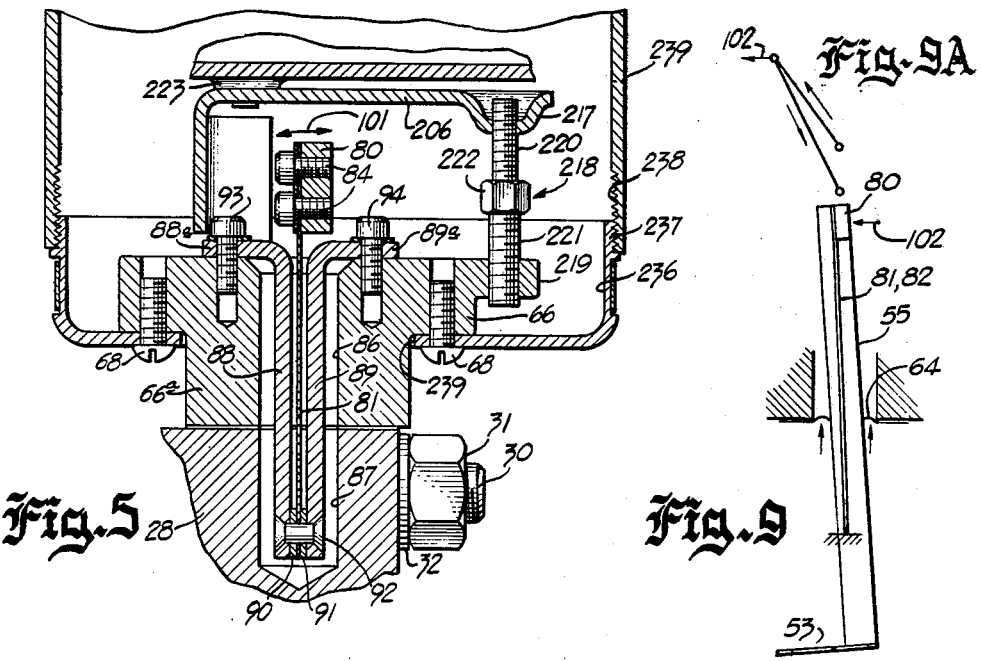
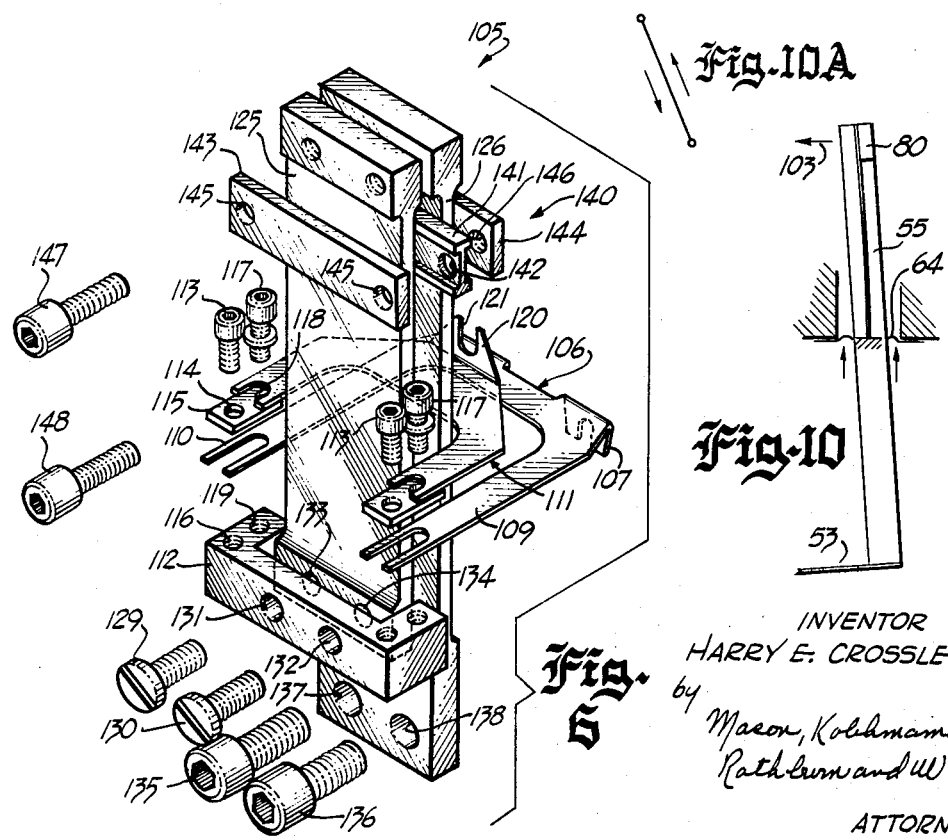
INVENTOR
HARRY E. CROSSLEY, JR.
by Mason, Kolehmainen,
Rathburn and Wyss.
ATTORNEYS Oct. 30, 1962     H. E. CROSSLEY, JR     3,061,823
DIFFERENTIAL PRESSURE TRANSMITTER
Filed Sept. 13, 1957     5 Sheets-Sheet 5
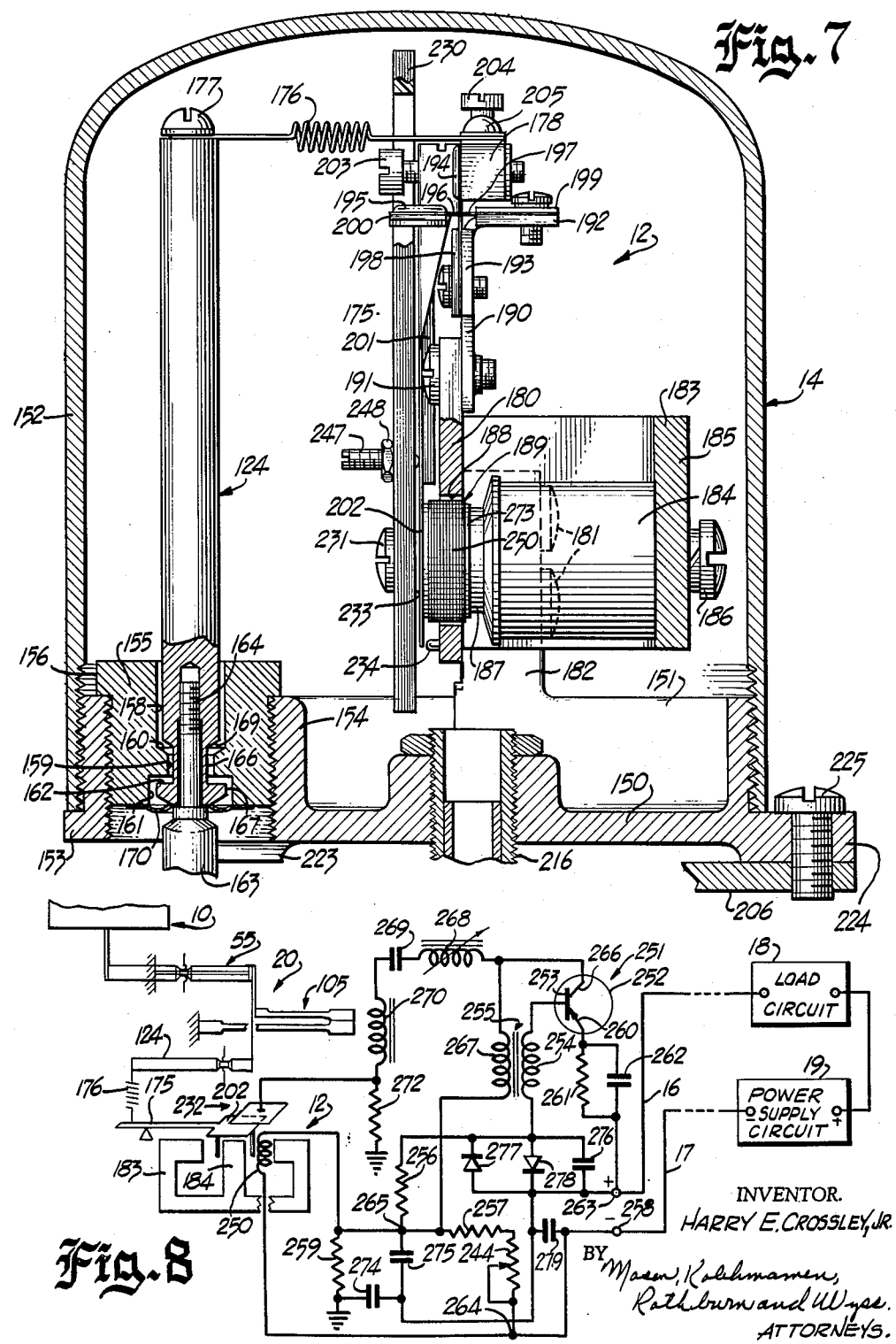
INVENTOR.
HARRY E. CROSSLEY, JR.
ATTORNEYS.

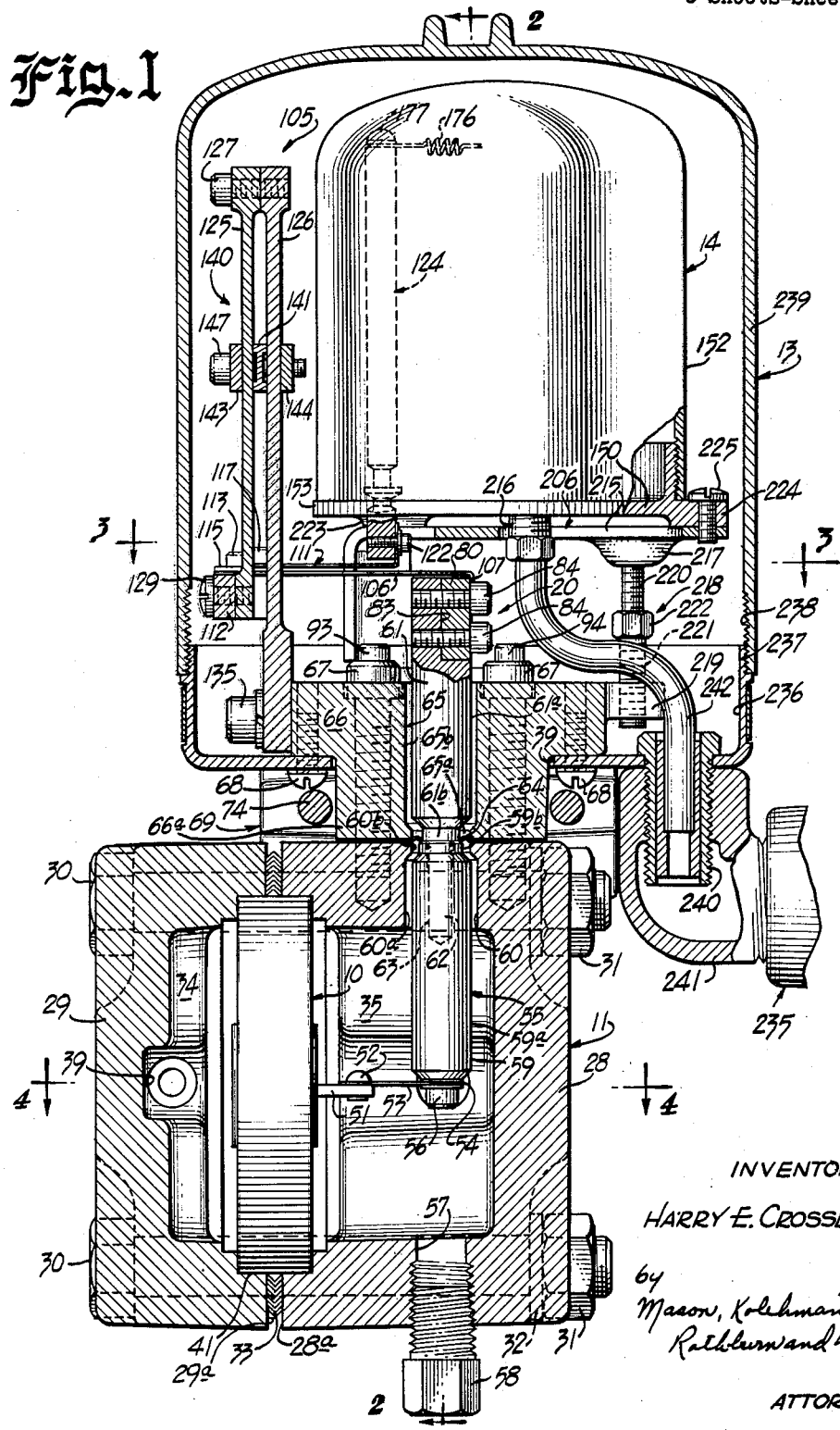

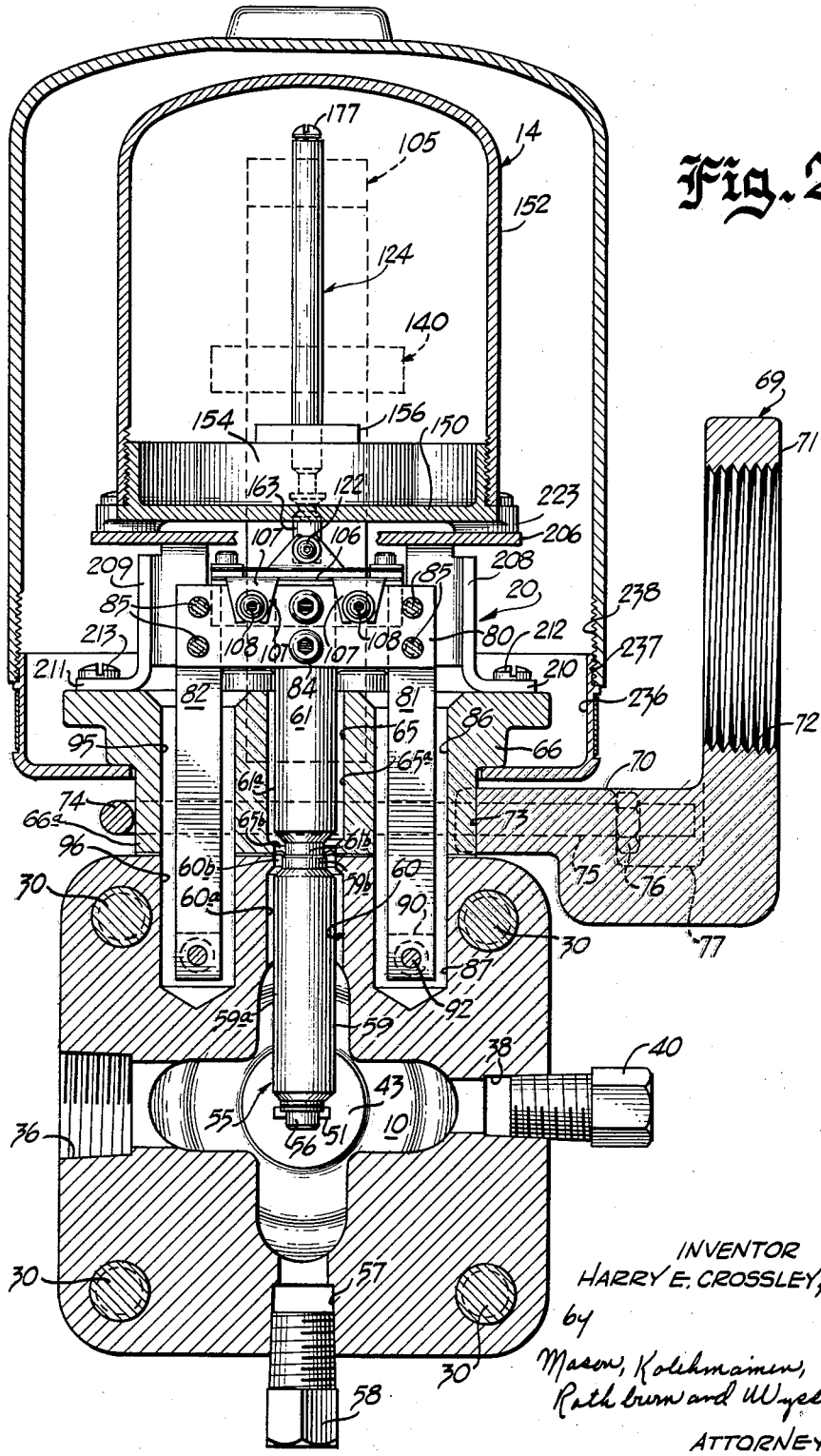

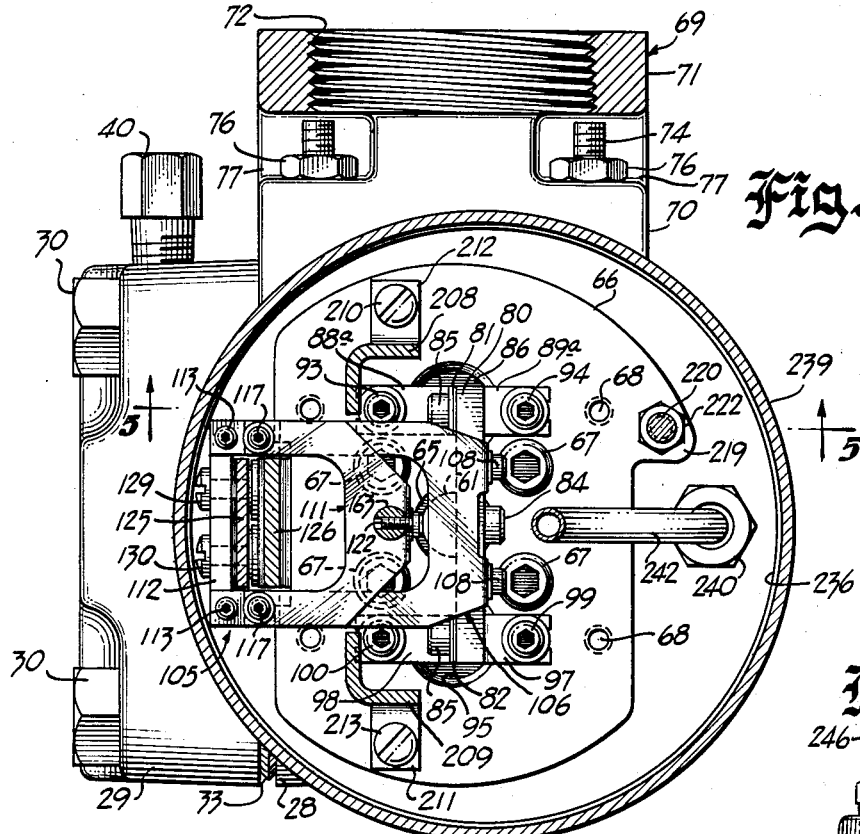
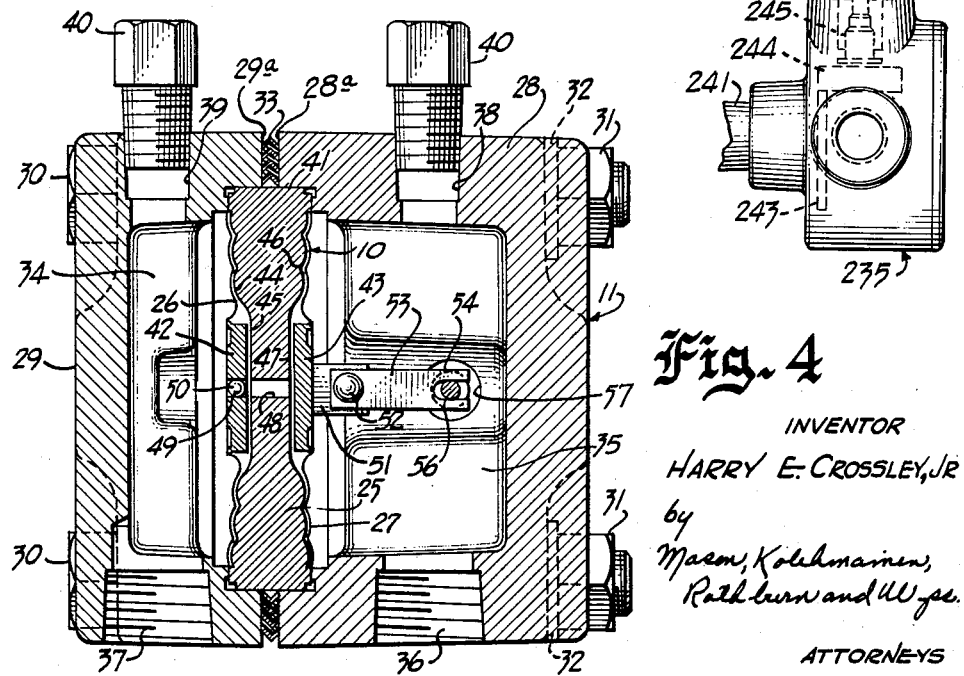

United States Patent Office 3,061,823
Patented Oct. 30, 1962

3,061,823
DIFFERENTIAL PRESSURE TRANSMITTER
Harry E. Crossley, Jr., Stratford, Conn., assignor, by mesne assignments, to Robertshaw-Fulton Controls Company, Richmond, Va., a corporation of Delaware
Filed Sept. 13, 1957, Ser. No. 683,729
17 Claims. (Cl. 340—187)

The present invention relates generally to differential pressure responsive mechanisms and more particularly to improvements in transmitters adapted to respond to differential pressure by developing electrical signals for transmission to remotely located equipment for indicating, recording and/or controlling the differential pressure.

Transmitters of the type referred to above may include a device having a pair of diaphragms respectively responsive to the pressures between which the differential is to be measured. The movement of the diaphragms in response to changes in the differential pressure is transferred via a motion transmitting mechanism to a force balancing unit which develops an electrical signal corresponding to the differential pressure. In transmitters of this type the pressure responsive device is so disposed within a housing that it divides the housing into two chambers, each of which is exposed to one of the diaphragms and is subjected to one of the pressures. The motion transmitting mechanism is connected to one of the diaphragms and is adapted to transmit the movements of that diaphragm from one of the chambers to the force balancing unit and, hence, is subjected to the static pressure in that particular chamber. In transmitters of prior design, the motion transmitting mechanism is generally affected by changes in static pressure and, as a result, the force balancing unit produces an output which reflects not only the movements of the diaphragm but also the errors introduced by the movement of the motion transmitting mechanism in response to the static pressure variations. One of the principal objects of the present invention, therefore, is to provide a new and improved motion transmitting mechanism which includes means for compensating for the changes in static pressure and, hence, contributes to the production of a differential pressure transmitter possessing increased accuracy.

It is also an object of the present invention to provide a motion transmitting mechanism according to the preceding object wherein the compensation is effected by a flexure type mounting arrangement having a spring rate which is changed in response to variations in static pressure.

A further object of the present invention is to provide a motion transmitting mechanism of the character described above which may be adjusted in a simple but efficient manner to provide a coarse range adjustment in order to maintain the magnitude of the movements transmitted to the force balancing unit within predetermined limits.

A still further object of the present invention is to provide a motion transmitting mechanism of the type previously described wherein a new and improved adjustment is provided for obtaining correlation between the position of the diaphragm and the level of the output signal from the force balancing unit, which adjustment is generally referred to as a "zero adjust."

It is likewise an object of the present invention to provide a differential pressure transmitter according to the preceding object wherein the zero adjust is effected by moving the force balancing unit in order to control the effect upon the balancing unit of movements transmitted by the motion transmitting mechanism.

Another object of the present invention is to provide a new and improved dual diaphragm type pressure responsive device which avoids the use of a mechanical connection between the two diaphragms.

The invention has for another object the provision of a new and improved structure for permitting access of the motion transmitting mechanism to the force balancing unit, which structure is effective to maintain the housing for the balancing unit explosion proof and, at the same time, to provide long narrow flame paths for inhibiting the spread of flames caused by the electrical circuit components within the housing.

Still another object of the present invention is to provide a differential pressure transmitter characterized by compact, rugged, yet efficient construction which can be manufactured at relatively low cost on a mass production basis.

The invention, both as to its organization and manner of operation, together with further objects and advantages thereof, will best be understood by reference to the following specification taken in conjunction with the accompanying drawings wherein:

FIG. 1 is a front elevational view, principally in section and with certain parts broken away, of a differential pressure transmitter embodying the features of the present invention;

FIG. 2 is a sectional view taken along a line substantially corresponding to the line 2—2 of FIG. 1, assuming, of course, that the latter shows the entire structure;

FIG. 3 is a sectional view taken along a line substantially corresponding to the line 3—3 of FIG. 1 again assuming that the latter shows the entire structure;

FIG. 4 is a sectional view taken along a line substantially corresponding to the line 4—4 of FIG. 1 assuming again that the latter shows the entire structure;

FIG. 5 is a sectional view taken along a line substantially corresponding to the line 5—5 of FIG. 3 with the assumption again being made that the latter shows the entire structure;

FIG. 6 is an exploded view of the range spring assembly employed in the differential pressure transmitter illustrated in FIG. 1;

FIG. 7 is an enlarged front elevational view, principally in section, of the balance assembly employed in the differential pressure transmitter of FIG. 1;

FIG. 8 is a schematic electrical circuit diagram of the differential pressure transmitter of FIG. 1 and shows the mechanical components of the transmitter in diagrammatic form;

FIGS. 9 and 10 are diagrammatic views illustrating the advantages of the flexure type mounting for the motion transmitting mechanism employed in the transmitter shown in FIG. 1;

FIGS. 9A and 10A are exaggerated force diagrams useful in explaining FIGS. 9 and 10; and FIG. 11 is a fragmentary view showing the housing for the fine span adjusting potentiometer and certan other electrical components of the transmitter shown in FIG. 1.

Referring now to the drawings, the differential pressure transmitter of the present invention is there illustrated as comprising a differential pressure responsive capsule 10 positioned within a lower housing indicated generally at 11, and an electro-mechanical balance assembly indicated generally at 12 which is disposed within an upper housing indicated generally at 13. The balance assembly 12 is mounted within an explosion-proof housing indicated generally at 14 and this balance assembly is connected to the output of the capsule 10 by means of a mechanical linkage or motion transmitting mechanism 20 to be described in more detail hereinafter so that the differential pressure responsive output of the capsule 10 is converted into a direct current electrical signal for transmission over a pair of conductors 16 and 17 (FIG. 8) from the process area where the differential pressure transmitter is located to the control area at which a load circuit 18 and power supply circuit 19 are connected in series between the terminal points of the conductors 16 and 17, it being understood that the load circuit 18 may comprise the input circuit of any suitable recording, indicating and/or controlling unit such, for example, as the type described in United States Patent No. 2,949,273 assigned to the same assignee as the present invention.

Considering now more particularly the differential pressure responsive capsule 10 and the manner in which it is mounted within the lower housing 11 and referring particularly to FIG. 4, it will be observed that the capsule 10 comprises a pair of thin, corrugated, metallic diaphragms 26 and 27 disposed on opposite sides of a backing plate 25. The capsule 10 is clamped between a somewhat cup-shaped body member 28 and a cover 29 which cooperates with the body member to define the lower housing 11. The members 28 and 29 are preferably somewhat square or rectangular in cross-section due to the fact that they are generally formed of stainless steel or other material which must be formed by machining since these materials cannot be forged or cast and the square shape can be machined more easily. In certain installations where chemically active fluids are employed which might corrode stainless steel the members 28 and 29 are formed of other materials but these materials also require machining. The members 28 and 29 are secured together by means of four bolts respectively extending between their four corners to receive the nuts 31 on their ends. The four corners of the cover 29 are recessed to accommodate the heads of the relatively short bolts 30 while the four corners of the body member 28 are similarly recessed to accommodate the nuts 31 and lock washers 32. To effect a fluid pressure seal an annular gasket 33 is interposed between the adjacent surfaces 28a and 29a of members 28 and 29. This gasket is preferably constructed of alternate layers or laminations of stainless steel and asbestos.

The capsule 10 divides the interior of the lower housing 11 into a first pressure chamber 34 and a second pressure chamber 35. In the illustrated embodiment, the chamber 35 is a high pressure chamber while the chamber 34 is a low pressure chamber. Fluid under pressure is admitted to the chamber 35 through an inlet opening 36 while fluid is admitted to the chamber 34 by way of an inlet opening 37. The outermost regions of the openings 36 and 37 are preferably tapped to permit the insertion of a suitable fitting or, alternatively, to accommodate a suitable plug (not shown) which may be employed during shipment of the transmitter or in the alternative to plug these openings when they are not used. Openings 38 and 39 are provided in alignment with the openings 36 and 37, respectively, and are shown with plugs 40 inserted therein which plugs may be removed to permit the openings 38 and 39 to serve as inlets in the event that access to these particular openings in a particular installation is more convenient than the openings 36 and 37.

As indicated above, the periphery of the capsule 10 is seated within an annular groove 41 defined at the junction of the members 28 and 29. Specifically, the diaphragms 26 and 27 are welded along their outer peripheries to the backing plate 25 and this welded region of the capsule is disposed within the annular groove 41. The diaphragms 26 and 27 are of generally circular configuration with circular corrugations therein and each diaphragm is further provided with a central circular opening having a bounding edge which overlies and is welded to the periphery of a spacer disk, the disk associated with the diaphragm 26 being indicated by the reference numeral 42 and the disk associated with the diaphragm 27 being identified by reference numeral 43. Under normal operating conditions the diaphragm 26 is adapted to be spaced slightly from the corrugated surface 44 on the backing plate 25 while the spacer disk 42 extends into but is spaced from a central recess 45 in the backing plate. In similar manner, the diaphragm 27 is normally adapted to be spaced a slight distance from the corrugated surface 46 of the backing plate while the spacer ring 43 extends into a central recess 47 in this plate. A through passageway 48 in the backing plate provides fluid communication between the recesses 45 and 47. The spaces between the diaphragms and the backing plate are adapted to be filled with an incompressible liquid so that the pressure in one of the chambers 34 or 35 applied against one of the diaphragms may be transmitted through the liquid in the capsule to the diaphragm. The capsule 10 is filled with liquid by first evacuating it and then introducing the liquid through a central opening 49 in the spacer disk 42 until the internal space in the capsule is completely filled. A sealing ball 50 is then inserted into the opening 49 and is sealed in place in any suitable manner as, for example, by ring staking. The convolutions on the surfaces 44 and 46 of the backing plate are adapted to match precisely the corrugations in the diaphragms 26 and 27 and, to this end, the diaphragms are preferably pressed against the surfaces 44 and 46 under high pressure during the assembly of the capsule 10.

In view of the foregoing description it will be recognized that the diaphragm 26 is exposed to the pressure of the fluid in the chamber 34 while the diaphragm 27 is exposed to the pressure of the fluid in the chamber 35 and, as a result, any difference or differential in these chamber pressures results in a corresponding movement of the two diaphragms. It will be noted that there is no mechanical connection or the like between the movable walls of the diaphragms, the transfer of pressure being accomplished by the relatively incompressible fluid between the diaphragms. The surfaces 44 and 46 of the backup plate provide effective support for the diaphragms under excess pressure conditions and thus minimize the possibility of distortion of the diaphragms due to such pressures. After the excess pressures have been removed or corrected the diaphragms return precisely to the desired position corresponding to the differential pressure conditions then existing.

To effect the transmission of the movement of the diaphragm 27 to the motion transmitting mechanism 20, an arm 51 is secured to the spacer disk 43 in any suitable manner and this arm is riveted, as indicated at 52, to a link 53 having a forked end 54 for connection to the motion transmitting mechanism 20. Specifically the forked end 54, as is best shown in FIG. 1, is secured to the lower end of an operating lever 55 in the motion transmitting mechanism 20. The latter connection is effected by means of an Allen head screw 56 which passes through the forked end 54 of the link and threads into an axial opening in the lever 55. An opening 57 in the body member 28 provides access to the screw 56 and is normally closed by means of a removable plug 58.

The lever 55 is preferably of two-piece construction and comprises an upper lever portion 61 and a lower lever portion 59 extending through an opening 60 in the body member 28. The latter opening includes a relatively large diameter portion 60a and a relatively small diameter portion 60b. The lower lever portion 59 includes a relatively large diameter section 59a and somewhat smaller diameter section 59b. The upper lever portion 61 is provided with a depending, externally threaded axial extension 62 thereon which is adapted to be received within a tapped opening 63 in the lower lever portion 59 in order to join the two lever portions. The construction of the upper lever portion 61 is somewhat similar to that of the lower lever portion in that the upper portion includes a relatively large diameter section 61a and a relatively narrow neck 61b. A thin, annular diaphragm 64 which is clamped between the neck 61b of the upper lever portion and the relatively narrow section 59b of the lower lever portion provides a fulcrum or pivot for the lever 55 and at the same time provides a seal for the chamber 35. The outer periphery of the sealing diaphragm 64 is clamped between the upper surface of the body member 28 and the lower edge of a body member 66 which effectively connects the lower housing 11 and the upper housing 13. The small diameter section 60b is provided so that the diaphragm 64 may be of relatively small diameter with the result that the total force exerted thereon due to static pressure in the chamber 35 is minimized. However, the reduced diameter sections 59b and 61b provide a relatively wide unsupported annulus of the diaphragm to maximize flexibility. The body member 66 is secured to the lower housing 11 by means of elongated attaching screws 67 which pass through the body member 66 and are threaded into tapped openings in the body member 28 of the lower housing to provide for sufficient application of pressure through the screws to clamp the sealing diaphragm 64 tightly between the body member 66 and the lower housing 11. The body member 66 is provided with recesses for accommodating the heads of the screws 67. The upper housing 13, as is explained more fully hereinafter, is secured to the body member 66 by means of a plurality of screws 68. The upper lever portion 61 extends through a central passage 65 in the body member and protrudes into the interior of the upper housing 13. The passage 65, like the opening 60 in the member 28, includes a narrow portion 65a and a larger diameter portion 65b.

A mounting bracket 69 best shown in FIG. 2 is secured to the body member 66 for the purpose of mounting the differential pressure transmitter upon the equipment at the process area where the transmitter is adapted to be located. The bracket 69 includes a main body 70 having an upstanding right angle flange 71 thereon which flange is provided with a tapped bore 72 for accommodating a conventional pipe stand. The main body 70 includes a notch or recess 73 for receiving the body member 66 and, to complete the connection of the bracket to the body member 66, a U-shaped clamp 74 is provided. The bight portion of the clamp 74 encircles the neck 66a of the body member 66 and its leg portions extend through openings 75 in the body 70 to receive nuts 76 which are disposed within recesses 77 formed in the body 70. The nuts 76 are tightened to provide a firm connection between the clamp 74 and the neck of the body member.

In accordance with an important feature of the present invention the lever 55 is mounted on flexures which extend well below the sealing diaphragm 64 and which prevent changes in static pressure in the chamber 35 from adversely affecting the operation of the motion transmitting mechanism 20. More specifically, a horizontal beam 80, which is secured to the upper end of the lever 55, is supported at its opposite ends by means of a pair of flexible metal strips or flexures 81 and 82 which are best shown in FIGS. 2 and 5. The beam 80 may be either of square section as shown or of any other suitable shape to provide high resistance to bending moments. The beam 80 is seated within a recess 83 (FIG. 1) at the extreme upper end of the upper lever portion 61 and is secured to the upper lever portion by means of machine screws 84. The flexure mounting strips 81 and 82 are respectively secured to the opposed ends of the beam 80 by means of screws 85 best shown in FIGS. 2 and 3. The mounting strip 81 extends downwardly from the beam through an opening 86 in the body member 66 and into a recess 87 in the lower body member 28 where it is clamped between a pair of L-shaped supports 88 and 89 shown best in FIG. 5. Specifically, the lower end of the mounting strip 81 is sandwiched between a pair of spacers 90 and 91 which are in turn interposed between the downwardly extending legs of the supports 88 and 89. A rivet 92 is passed through aligned openings in the supports 88 and 89, in the spacers 90 and 91 and in the mounting strip 81 in order to complete the assembly. The support 88 includes a right angle flange 88a which rests upon the upper surface of the body member 66 and is secured to the body member by means of machine screw 93. In similar manner the support 89 is attached to the body member 66 by means of a machine screw 94 which holds its right angle flange 89a in position. As shown in FIG. 2, the mounting strip 82 extends through an opening 95 in the body member 66 and into a recess 96 in the body member 28 of the lower housing where it is held in position by means of a pair of supports 97 and 98 (FIG. 3) which are identical to the supports 88 and 89 previously described. The support 97 is secured to the body member 66 by means of machine screw 99 while support 98 is secured to the body by means of machine screw 100. The mounting strips 81 and 82 possess sufficient tensile strength to inhibit longitudinal movement of the lever 55 in response to relatively high static pressure acting upon the sealing diaphragm 64, but at the same time these mounting strips are sufficiently flexible to permit bending movement of the lever in the direction indicated by the arrows 101 in FIG. 5. In this connection it will be observed that movement of the diaphragm 27 in response to an increase in pressure in the chamber 35 which is not accompanied by a change in pressure of the fluid in chamber 34 tends to pivot the lower end of the lever 55 in a clockwise direction as viewed in FIG. 1 so that the mounting strips 81 and 82 are flexed to effect movement of the beam 80 in a direction extending normal to the plane of the mounting strips, i.e. in a clockwise direction as viewed in FIG. 5.

The described mounting arrangement for the beam 80 compensates for changes in static pressure of the fluid in the chamber 35 by producing a force moment which behaves like a spring rate and acts in opposittion to the spring rate changes actually produced by application of force longitudinally of the strips 81 and 82 by the static pressure acting upon diaphragm 64. To facilitate an understanding of the advantages provided by this mounting arrangement, attention is directed to FIG. 9 which schematically illustrates the operating lever 55 supported upon flexure strips 81 and 82 which extend well below the sealing diaphragm 64. FIG. 10, on the other hand, diagrammatically illustrates a mounting arrangement wherein the operating lever is supported upon flexures which, as contrasted with the present invention, are supported at fixed points located approximately at the same level as the sealing diaphragm. It should first be observed that the operating lever 55 is adapted to occupy a particular angle for a given differential pressure between the fluids in the chambers 34 and 35. If the static pressure of the fluid in the chamber 35 increases without a corresponding increase in the differential pressure it will be observed that the sealing diaphragm 64 is urged upwardly and the flexure mounting strips 81 and 82 are placed under tension. As the mounting strips 81 and 82 are placed under tension their spring rate is increased so that, in the absence of compensation, a given change in differential pressure would not result in the same angular movement of lever 55 as would be the case if the flexible strips were not under tension. However, as will be observed in FIGS. 9 and 9A, which is an exaggerated force diagram of the structure shown in FIG. 9, the forces acting upon the sealing diaphragm 64 create a moment upon the beam 80 which acts in the direction of the arrow 102. The magnitude of this moment is a function of the dimensions of the flexures 81 and 82 and of the angle occupied by the lever 55. Thus, as the latter angle increases the restoring moment becomes larger with the result that this moment behaves like a negative spring rate and functions to compensate for stiffening of the flexures 81 and 82 under increased tension. If, on the other hand, the mounting flexures were supported at their lower ends at substantially the same level as the sealing diaphragm 64, as shown in FIG. 10, no lateral force moment would be produced, as is evident from FIG. 10A, and when the static pressure increases the increased spring rate of the flexures is uncompensated and results in an error in the position of the lever 55. Thus, the mounting arrangement illustrated in FIG. 10 would result in considerable error in the motion transmitting mechanism in response to changes in the static pressure in the sealed chamber to which the motion transmitting mechanism is connected.

The angular deflections of the lever 55 in response to differential pressure changes are transmitted to the force balance assembly 12 by means of a range spring assembly 105 which is best shown in FIGS. 2, 3 and 6 of the drawings. The range spring assembly 105 includes a flexible, horizontal, bifurcated link 106 having a pair of spaced depending flanges 107 which are connected to the beam 80 by means of Allen head screws 108 best shown in FIGS. 2 and 3. The bifurcated link 106 further includes a pair of parallel extending legs 109 and 110 each having a forked end portion which is secured to a horizontal bar 112 connected to the bottom end of a range spring element 125 to be described more fully hereinafter. Also connected to the bar 112 is another link 111 which connects the range spring assembly 105 to the bottom end 163 of a vertical lever 124 extending into the housing 14 for the balance assembly 12. More specifically, a pair of Allen head screws 113 are passed through apertures 114 in a spacer 115, through the forked end of each of the arms 109 and 110, and are threaded into tapped openings 116 in the bar 112 for the purpose of securing the link 106 to the bar. Allen head screws 117 pass through the forked end of each leg of the link 111, through second apertures 118 in the spacer 115 and through the link 106 and are threaded into openings 119 in the bar 112 for the purpose of securing the link 111 to the bar 112. The link 111 includes a right angle flange portion 120 having a screw receiving slot 121 therein for accommodating a machine screw 122 (FIGS. 2 and 3) which functions to connect the link arm to the lever 124.

The range spring assembly 105 further includes flexible range spring elements 125 and 126 which are interconnected at their upper ends by means of Allen head screws 127 (FIG. 1). The element 125 is secured at its lower end to the bar 112 by machine screws 129 and 130 which extend through apertures 131 and 132, respectively, in the bar 112 and are threaded into tapped openings 133 and 134, respectively, in the enlarged bottom of the element 125. The lower end of the element 126 is fixedly secured to the body member 66 by means of Allen head screws 135 and 136 which extend through openings 137 and 138, respectively, in the element 126 and are received within tapped openings extending laterally into the body member 66. In order to obtain a desired range of deflection of the lever 124 for various ranges of differential pressure, there is provided a variable clamp assembly 140 which is adapted to be moved along the length of the elements 125 and 126 to vary the loading force provided by the range spring elements 125 and 126. The mechanism 140 comprises a center beam 141 which, as illustrated in FIG. 6, comprises an I-section beam having apertures 142 formed at the opposed ends of its web portion together with a pair of horizontal bars 143 and 144 extending parallel to the web of the center beam 141. The bars 143 and 144 are respectively provided with apertures 145 and 146 in alignment with the apertures 142 in the center beam 141. Adjustable Allen head screws 147 and 148 are threaded into the aligned apertures for the purpose of clamping the bars 143 and 144 and the center beam 141 to the plates 125 and 126. By loosening the screws 147 and 148 the clamping pressure on the bars is released so that the entire range adjusting mechanism 140 may be moved manually along the elements 125 and 126 to a new position whereupon the screws 147 and 148 may be tightened again. In effect, the coarse range spring assembly 105 acts like a folded cantilever spring the effective length of which can be varied by moving the range adjusting clamp assembly 140 so that when the latter assembly is moved upwardly as viewed in FIG. 1 the effective length of the cantilever spring is increased while downward movement of the clamp assembly effectively decreases the length of the range spring.

In accordance with another important feature of the present invention, the lever 124 enters the housing 14 for the balance unit through an inlet seal which provides an explosion-proof closure for this housing and at the same time is so constructed that only flame paths of long, narrow, tortuous configuration are provided from the interior of the housing to the exterior. Specifically and referring particularly to FIG. 7, the housing 14 for the balance assembly is of two piece construction including a base portion 150 having an externally threaded, upwardly extending, annular rim 151 for accommodating a removable cup-shaped cover 152 which is threaded onto the rim 151 and is seated against an annular lip 153 formed on the base. The base 150 further includes an upwardly extending, internally threaded, cylindrical boss 154 for accommodating a generally cylindrical sleeve 155 which is threaded into the boss 154 until an annular lip 156 at its upper end abuts against the extreme upper end 157 of the boss. The sleeve 155 is provided with a central, axial opening defined by a relatively large diameter portion 158 and a relatively small diameter portion 159 interconnected by a tapered seat 160. A second relatively large diameter portion 161 is connected to the portion 159 by means of a shoulder 162.

The lever 124 includes a lower lever portion 163 with an axially extending stem 164 having a threaded end portion thereon which is threaded into a tapped axial opening in an upper lever portion 165 in order to unite the two lever portions. A substantially cylindrical collar 166 encircles the stem 164 and is interposed between the lower end of the upper lever portion 165 and the upper end of the lower lever portion 163. The collar 166 includes a laterally and outwardly extending flange 167 which is adapted to cooperate with the shoulder 162 to limit the upward movement of the lever 124. The lower end of the upper lever portion 165 is tapered as indicated at 169 in order to cooperate with the tapered seat 160 to limit the downward movement of the lever 124. An annular sealing gasket 170, which is welded along its inner periphery to the collar 166 and is welded along its outer periphery to the lower end of the sleeve 155, provides a pivot or fulcrum for the lever 124 and at the same time seals the housing 14. The interior of the upper housing 13 is at atmospheric pressure and, accordingly, in the event of an explosion within the housing 14 for the force balance assembly a high pressure is generated within the housing 14 which acts against the sealing diaphragm 170 to force the lever 124 downwardly. The tapered portion 169 of the lever 124 seats against the tapered seat 160 and prevents further downward movement of the lever 124, thus preventing rupture of the sealing diaphragm 170 and at the same time confining the explosion within the housing 14. Moreover, flames which may accidentally be developed between the electrical components disposed within the housing 14 are prevented from spreading due to the fact that the only flame paths provided to the exterior of the housing 14 are extremely long and narrow. Specifically, flames must travel either along a first path formed by the threads joining the sleeve 155 and the cylindrical boss 154 or along a second tortuous path defined between the interior of the sleeve 155 and the exterior of the upper lever portion 165, the collar 166 and the lower lever portion 163. Both of these paths are extremely long and thus the likelihood of the spread of flames from within the housing 14 is negligible. Moreover, the welds between the sealing diaphragm 170 and the collar 166 and the clamp 155 make it even more unlikely that the flames will be able to escape along the second path described above.

A connection from the lever 124 to a balance beam 175 forming the heart of the force balance assembly 12 is completed through a linear load spring 176 which is attached at one end to the extreme upper end of the lever 124 by means of machine screw 177 and at its other end is secured to a bar 178 mounted on the balance beam. The force balance assembly 12 is generally similar to the arrangement described and claimed in United States Patent Nos. 2,913,672 and 3,011,348, both of which are assigned to the same assignee as the present invention.

Specifically, the components of the force balance assembly 12 are mounted upon a base plate 180 which is secured by means of screws 181 to a pair of mounting bosses 182 formed integral with the base 150 of the balance assembly housing 14. The base member 180 functions to support the magnetic structure of the balance assembly 12 and also supports the deflectable beam 175 of the balance unit and the electrical circuit components associated therewith so that a rugged, compact structure is provided wherein the parts may be readily assembled with a minimum number of mechanical tolerances while at the same time the balance unit is rendered relatively insensitive to changes in ambient temperature and the attendant expansion and contractions of its metal parts. More particularly, as is best illustrated in FIG. 7, a substantially U-shaped member 183 is staked to the base plate 180 by means of depending attaching legs (not shown) on the U-shaped member which extend through appropriate openings in the base member and are peaned over to complete the assembly. A cylindrical magnet 184 is secured to a top wall or bight portion 185 of the U-shaped member 183 by means of a bolt 186 extending through the center of the magnet 184 and into a cylindrical pole-piece 187 so that the magnet and the pole-piece are held in assembled relation on the wall 185. The base 180 is provided with a circular opening 188 the edge or boundary of which cooperates with the pole-piece 187 to define an annular air gap 189 within which a concentrated magnetic field is developed, it being understood that the magnetic circuit is completed through the base 180 and through the walls of the U-shaped member 183 to the magnet 61.

For the purpose of supporting the deflectable beam 175 of the balance unit assembly 12 there is provided a bracket 190 which is secured to the base 180 by means of screws 191 and is provided with a right angled flange portion 192 extending laterally from its vertical leg 193. The balance beam 175 is provided with a pair of vertical mounting flanges 194 and a pair of horizontal mounting flanges 195 although only one flange of each pair is visible in FIG. 7. Each of these flanges is provided with a central rivet receiving opening. To support the beam 175, resilient mounting elements 196 are connected to each of the flanges 194 and resilient mounting elements or flexures 197 are connected to each of the flanges 195. Specifically, the resilient elements 196 and 197 are each provided with enlarged end portions which are clamped to the corresponding flange portions of the beam 175 and to the supporting bracket 190. More particularly, the upper end portion of the flexure 196 is clamped between the bar 178 and the mounting flange 194 by means of rivets or the like while the lower end of each of the flexures 196 is clamped between the leg portion 193 of the bracket 190 and a clamping plate 198 which extends across the bracket. The right end of each of the flexures 197 as viewed in FIG. 7 is clamped between the right angled leg 192 of the bracket 190 and a horizontal clamping plate 199 while the left hand of each of the flexures 197 is clamped between one of the mounting flanges 195 and a horizontal clamping plate 200 extending between the flanges 195. The central portions of the resilient mounting elements 196 and 197 are offset with respect to the center lines of the end portions of these elements and the end portions of each pair of elements are oppositely disposed thereby providing a compact, crossed flexure mounting arrangement wherein the end portions of each pair of resilient elements are positioned in a common plane with respect to the axis of the beam 175. The intermediate portion of the beam 175 is provided with a trough-like portion 201 for increased rigidity of the beam and the beam is also provided with an enlarged flat end portion 202 which acts as a planar control element of the force balance unit 12 since it carries the feedback coil of the oscillator circuit to be described more fully hereinafter.

In order to balance the beam 175 statically about its rotational axis in one plane there is provided a large headed screw 203 which extends through an opening in the beam and threads into a central opening extending transversely of the bar 178. A similar screw 204 is threaded into another aperture in the bar 178 in order to provide for adjustment of the static balance of the beam 175 in a plane at right angles to the first. After the screws 203 and 204 have been adjusted to obtain static balance of the beam 175 so that the center of gravity of the beam coincides with its center of rotation, these screws are held in place by means of suitable spring wire retainers which are not shown in the drawings but which engage the threads of the screws and apply a side thrust thereon in a manner described in detail in the above identified Patent No. 3,011,348 to which reference may be had for a more complete description of the construction and operation of the force balance unit 12.

The beam 175 is preferably made of aluminum in order to reduce the inertia effects of the beam. The bar 178 is also preferably constructed of aluminum so as to have the same characteristics as the beam 175 and as a result, this bar acts as a counterweight to balance the weight of the end portion 202 of the beam. It will be noted that the bar 178 and the screws 203 and 204 are all mounted very close to the pivotal axis of the beam 175 so that inertia effects, which vary as the function of the square of the distance from the pivot axis, are relatively small. The planar end portion 202 of the beam, on the other hand, is positioned as far as possible from the pivot axis while maintaining a compact structure so that a high torque to inertia ratio is achieved.

As indicated above, the movement of the operating lever 124 is transferred to the balance beam 175 by way of load spring 176 which is secured to the bar 178 by means of a clamping screw 205. The use of a linear motion transmitting device of tihs type permits zero adjusting of the transmitter of the present invention by altering the position of the force balance assembly 12 with respect to the motion transmitting mechanism 20. This alteration is effected by tilting the housing 14 for the balance assembly unit 12 and, to this end, the base 150 is mounted upon a bracket 206 which is best shown in FIGS. 1 and 5 of the drawings. The latter bracket includes a flat horizontal body portion 207 having a pair of spaced apart downwardly extending legs 208 and 209 (FIG. 2) each of which includes an outwardly bent foot, these feet being respectively designated by the numerals 210 and 211. The feet 210 and 211 are secured to the body member 66 by means of machine screws 212 and 213, respectively, thereby fixedly to secure one end of the bracket 206 to the body member 66. The flat body portion 207 of the bracket is provided with a recess 214 (FIG. 1) at one end thereof to permit passage of the lower lever portion 163 through the space between the legs 208 and 209 and upwardly through the recess. The flat base portion 207 also includes an elongated slot 215 for accommodating a fitting 216 leading into the housing 14 for the balance unit. The flat body portion 207 is further provided with a raised boss 217 having a tapped central opening therein for receiving one end of an adjusting screw 218 the other end of which is threaded into a tapped opening in an ear 219 formed integral with the body member 66. The adjusting screw 218 includes a pair of stem portions 220 and 221 having threads of different pitch thereon and a central turning head 222 which may be rotated by means of a suitable tool to turn the screw 218. Since the stem portions 220 and 221 are of different pitch, rotation of the adjusting screw 218 results in pivoting or tilting movement of the bracket 206 about its feet 210 and 211 in a direction which is dependent upon the direction of rotation of the screw. The use of an adjusting screw having stems of different diameter provides relatively small movement of the bracket 206 for a given rotation of the head 222 thereby facilitating accurate adjustment of the bracket position.

The base member 150 of the balance unit assembly housing includes downwardly depending mounting pads 223 and 224 the lower levels of which are aligned. Each of these pads rests upon the upper surface of the flat body portion 207 of the bracket 206 and the pad 224 includes a tapped central opening for accommodating a machine screw 225 which functions to secure the body member 150 to the bracket 206. Thus, as the bracket 206 is pivoted by adjustment of the screw 218, the entire housing 14 and the force balance assembly 12 is moved with respect to the operating lever 124 thus altering the force applied to the beam balance 175 through the load spring 176.

Considering now the details of the oscillator circuit and referring particularly to FIGS. 7 and 8, it should be noted that a large majority of the components making up this circuit are mounted upon a printed circuit board 230 which is secured to the base member 180 by means of machine screws 231. The printed circuit board 230 carries the circuit components illustrated schematically in FIG. 8 and includes a pattern of conductors thereon interconnecting these circuit components in the manner illustrated in the schematic diagram. A tuning condenser 232 in the oscillator circuit is formed by a fixed plate on the surface 233 of the printed circuit board 230 and by a movable plate formed on the planar end portion 202 of the balance beam 175. As the balance beam 175 is moved in response to forces transmitted from the motion transmitting mechanism 20, the capacity of the tuning condenser 232 is varied.

Those components of the oscillator circuit which are not mounted on the printed circuit board 230 are contained within a housing 235 which is carried upon the upper housing 13. Specifically, the upper housing comprises a base tray 236 having an externally threaded, upwardly extending lip 237 for receiving an internally threaded portion 238 of a cup-shaped cover member 239 which cooperates with the base tray 236 to enclose a majority of the elements of the motion transmitting mechanism 20 and to enclose the housing 14 for the balance assembly 12. As previously indicated, the base tray 236 is secured to the body member 66 by means of screws 68 and this base tray is therefore provided with a central aperture 239 the boundary or edge of which encircles the neck 66a of the body member 66. The base tray 236 is further provided with an opening for accommodating a clamp 240 having an externally threaded sleeve onto which is threaded one end of a knuckle or right-angled coupling member 241. The other end of the coupling member 241 is threaded into an opening in the housing 235. A conduit 242 extends between the fittings 216 and 240 in order to define a passage for the conductors connecting the components mounted on the printed circuit board 230 with those components enclosed within the housing 235. As is best illustrated in FIG. 11, the interior of the housing 235 has mounted therein a terminal board having terminals thereon for connection with the conductors passing through the conduit 242 and through the coupling 241 and, in addition, a fine range adjusting potentiometer 244 of conventional construction is mounted within the interior of the housing 235. The adjustable shaft of the latter potentiometer extends into an opening 245 in the housing 235 which opening is accessible from the exterior of the housing by removal of a plug 246. When the plug is removed an elongated screw driver or other adjusting tool may be inserted into the opening 245 in order to adjust the potentiometer 244.

In order to limit the movement of the planar end portion 202 of the balance beam 175 toward the base 180, a stop pin 234 is provided near the lower edge of the base. Movement of the beam 175 toward the printed circuit board 230 is limited by means of an adjustable screw 247 which threads through a nut 248 secured to the printed circuit board and extends through the board so that its end portion limits the movement of the beam 175 by engaging the trough 201.

In order to apply a force to the balance beam 175 in opposition to the torque exerted thereon through the movements of the motion transmitting mechanism 20, there is provided a feedback coil 250 which is supported upon the planar end portion 202 of the balance beam 175. As is best illustrated in FIG. 7, the coil 250 extends into the annular air gap 189 and is adapted to be moved within this gap when the beam 175 is deflected.

The coil 250 is wound upon a coil form 273 comprising a thin sleeve of aluminum carried upon the planar end portion 202 of the balance beam. Since the coil form 273 is formed of aluminum it acts as a shorted turn which is positioned within the air gap 189 to provide a damping action and at the same time to furnish a support for the feedback coil 250. The damping action provided by the aluminum coil form effects increased stability of the transmitter unit and at the same time allows the use of an oscillator circuit having relatively high sensitivity. The feedback coil is wound so that it has a length substantially greater than the depth of the air gap 189 and, as a result, throughout the range of movement of the balance beam 175 between the limiting positions established by the stops 234 and 247 substantially the same number of turns of the feedback coil are positioned within the air gap and the force applied to the beam 175 by virtue of the current flow through the feedback coil is linearily related to the feedback current over the entire range of the transmitter.

The winding of the feedback coil 250 is preferably copper wire and the winding or slide wire of the span potentiometer 244 as well as the winding of wire wound fixed resistor 257 are formed of a copper alloy having substantially the same temperature coefficient as the winding of the feedback coil. Thus, changes in ambient temperature affect both branches of the parallel circuit in the oscillator circuit to the same extent and the current flow through the feedback coil is stabilized to a large degree despite temperature changes.

The feedback coil 250 is connected to the base circuit of an oscillator 251 employing a transistor 252. Specifically, the base 253 of the transistor 252 is connected through one winding 254 of a feedback transformer 255 and through a resistor 256 to junction point 265 of a parallel circuit one branch of which consists of the feedback coil 250 and the other branch of which includes a fixed resistor 257 and the fine range adjusting potentiometer 244 referred to above. The lower junction 264 of the branches of this parallel circuit is connected to B minus terminal 258 which is in turn connected through the conductor 17 to the negative terminal of the power supply 19 at the remote station. A resistor 259 establishes D.C. ground potential for the point 265 while condensers 274 and 275 provide a low impedance A.C. current path from point 265 to ground. The emitter 260 of the transistor is connected through a biasing resistor 261 and its bypass condenser 262 to the positive terminal 263 which is in turn connected to the positive terminal of the power supply 19 through conductor 16 and load circuit 18 containing the control, recording and/or indicating equipment referred to above. The collector 266 of the transistor 252 is connected through a second winding 267 of the feedback transformer 255 to the junction point 265 and is also connected through a tuning inductor 268, a fixed capacitor 269 and a fixed inductor 270 to the fixed plate of the tuning condenser 232. The movable plate of the condenser 232 is, of course, grounded so that the tank circuit for the collector includes inductors 268 and 270, winding 267, and condensers 274, 275 and 232. Resistor 272 provides a D.C. ground for the tank circuit of the collector.

The oscillator circuit 251 illustrated in FIG. 8 acts as a discriminator circuit having a predetermined frequency at which oscillation will be strongest with the oscillations decreasing both above and below the predetermined frequency. While a number of explanations have been advanced for the operation of this oscillator circuit and the exact mode of operation is difficult to determine, the following explanation, which appears to be plausible, is given for the sake of clarity. At high frequency the oscillations drop off because the transistor approaches cut off while at low frequencies the drop off occurs because the phase shift in the circuit causes the feedback signal to be so phased that oscillations decrease. The circuit illustrated in FIG. 8 is adapted to function on the low frequency side of the oscillator output curve, that is, on the rising slope of the conventional curve representing oscillator output versus frequency. To this end, a normal working frequency of 400 kilocycles is employed. The frequency of oscillation is, of course, determined by the tank circuit in the collector while the current fed back to the base circuit through the feedback transformer 255 sustains the oscillations. Thus, as the beam 175 is moved away from the fixed plate of the tuning condenser 232, the capacity of the latter decreases while the oscillator frequency increases and, conversely, when the beam 175 moves toward the fixed condenser plate the oscillator frequency decreases.

In order to obtain high sensitivity of the oscillator circuit 251, the discriminating action is relatively sharp and this has been achieved to a large extent by making the value of the condenser 262 well below the value required for efficient bypassing of resistor 261. As a result, the effective input impedance of the transistor 252 is inversely proportional to the square of the frequency, first because the impedance of condenser 262 decreases as frequency increases and, second, because the impedance of the emitter circuit varies with the gain of the transistor. Specifically, both the impedance of condenser 262 and the gain of the transistor decrease with increased frequency thus causing the total transistor input impedance to vary as the square of the frequency. Both of these factors, that is, the change in impedance of condenser 262 and the change in gain of the transistor in response to frequency increases contribute to provide high sensitivity of the oscillator output signal to small frequency changes or, more particularly, to small changes in the capacity of the tuning condenser 232 in response to variations in force transmitted through the spring 176.

When oscillation occurs, rectification takes place at the emitter-base junction thus building up a bias current in the transistor which serves as the output current and passes through the parallel circuit including the feedback coil 250 connected in shunt with resistor 257 and potentiometer 244, through conductor 17, power supply 19, load circuit 18, conductor 16, and resistor 261. If the capacitance of the tuning condenser 232 is varied in response to forces transmitted through the load spring 176, the current flow through the described circuit is altered thereby changing the current flow through the feedback coil 250 and, hence, applying a force on the beam 175 in opposition to the force applied through the load spring 176. Specifically, if the beam 175 moves away from the fixed plate of tuning condenser 232 to increase the oscillator frequency, the input impedance of the transistor decreases sharply and, as a result, the transistor can be driven harder so that the output current resulting from the rectification at the emitter-base junction rises. The increase in output current causes an increased current flow through the feedback coil 250 to create a force for balancing the change in force applied to the beam via spring 176. Obviously, if the beam 175 moves toward the fixed plate of tuning condenser 232 to decrease the oscillator frequency, the output current and the current flow to the feedback coil 250 decrease.

The differential pressure transmitter of the present invention must function in a number of different environments that may be encountered in different installations and the conditions such as temperature existing often vary considerably. Thus, the transmitter is designed to operate at temperatures ranging from 150° or more Fahrenheit to −40°. However, the cut-off current of the transistor decreases with temperature. It has been found that this cut-off is halved with every 20° drop in temperature and, as a result, at temperatures near −40° the cut-off current is so low that it is extremely difficult to initiate oscillations with the transistor in its quiescent state since the input impedance of the transistor is very large. To overcome this difficulty, a biasing circuit including diodes 277 and 278 is provided. The diodes 277 and 278 are biased or poled in opposite directions and are connected in parallel with the resistor 261, the emitter-base junction and winding 254. The forward resistance of these diodes is relatively high for low currents but decreases for high currents and, hence, at low temperatures when impedance of the emitter-base junction is high current from the positive terminal 263 is divided between the diode 277 and the circuit including the emitter-base junction. The currents through the two branches of the last mentioned circuit are combined and pass through resistor 256 and coil 250 shunted by potentiometer 244 and resistor 257, to the negative terminal 258. Since the resistance of diode 277 is high for this low current, sufficient current passes through the emitter-base junction to reduce the input impedance of the transistor and permit oscillations to be started. When the current flow increases as, for example, by an increase in temperature or when oscillations begin, the resistance of diode 277 decreases so that more of the biasing current is diverted from the emitter-base circuit. Condenser 276 provides a path for oscillations or A.C. current to bypass the diodes 277 and 278. Any D.C. charge tending to build up on the condenser 276 due to D.C. current flow in the emitter-base circuit is discharged through the diode 278.

If the current to the load circuit 18 increases, the voltage appearing between terminals 258 and 263 decreases and, as a direct result, the voltage drop across the transistor also decreases. The transistor collector capacity thus changes in a direction to increase the frequency of oscillations and, hence, to increase the output still further, thereby producing a regenerative action which increases the sensitivity to a point where low frequency oscillations in the order of 10 cycles per second may be developed due to phase lags produced by inertia effects in the mechanical components of the system. These low frequency oscillations are somewhat analogous to a hunting action since the mechanical system is attempting to follow the electrical system but the latter is so sensitive that it immediately responds to any change in the mechanical system. A large tantulum condenser 279 is thus connected across terminals 258 and 263 to filter out any such low frequency oscillations. Thus, this condenser presents a relatively low impedance to low frequency currents and prevents them from changing the voltage across the transistor.

It will be observed that the branch of the parallel circuit including the potentiometer 244 shunts a portion of the output current around the oscillator coil 250 and this potentiometer may be adjusted to alter the current flow through the feedback coil in order to effect a fine range or span adjustment which cooperates with the coarse span adjustment effected by the mechanism 140 previously described to determine the upper and lower limits of the current delivered to the load circuit 18. To make the output current to the load agree with a given or known pressure differential so that changes in the load current accurately reflect any variations in the pressure differential, a "coarse" and "fine" zero adjustment is made. The "coarse" adjustment is effected by loosening screws 117 and moving the link 111 with respect to the bar 112 and along the link 106 in order to alter the force applied to the lever 124 while the "fine" zero adjustment is effected, as indicated previously, by turning the adjusting screw 218.

It is desirable that the A.C. voltage on the tuning condenser 232 be maintained at a minimum value in order to reduce electrostatic forces on the beam and, to achieve this result, a fixed inductor 270 isolates the tuning condenser 232 from stray capacitances. The oscillator tank circuit is so designed that the relatively small tuning condenser 232 is the major component for controlling the oscillator frequency and the variable inductance 268 is employed in order to rebalance the circuit in the event that it becomes necessary to replace the transistor 252 with another transistor having slightly different characteristics.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. A differential pressure transmitter comprising a lower housing, an upper housing, a body member connected between said upper and lower housings and having an opening therein connecting the interior of the lower housing to the interior of the upper housing, a first vertical lever extending through said opening, a sealing diaphragm having an outer portion clamped between the body member and the lower housing and having an inner portion secured to said first lever, means defining first and second pressure chambers in said lower housing each exposed to a fluid pressure, means responsive to the differential pressure between said chambers for transmitting movements to the lower end of said first lever in order to rock said first lever about said diaphragm, a horizontal beam connected to the upper end of said first lever, a pair of flexible strips each secured at its upper end to said beam, means on said body member supporting each of said strips at its lower end for movement about points disposed vertically below said outer portion of said diaphragm, a first link secured to said beam, first and second flexible spring elements extending parallel to each other and connected together at one end, means connecting the other end of the first element to said first link, means for securing the other end of the second element to said body member, a second link connected to the first link, a force balance unit including a balance beam and also including a casing disposed within said upper housing, a second vertical lever pivotally mounted on said casing and connected at its lower end to said second link, a load spring connected between the upper end of said second lever and said balance beam, a bracket supporting the balance unit casing upon said body member, means for tilting said bracket and said balance unit casing with respect to said body member in order to vary the force transmitted to said balance beam through said spring, means for adjusting the position of the second link with respect to the first link in order to alter the position of the second lever and, hence, to vary the force transmitted to the balance beam, and an adjustable clamp movable along both of said elements for providing a span adjustment for altering the range of movement of the second lever in response to a predetermined range of movement of the first lever.

2. A transmitter for process control systems comprising a lower housing, an upper housing, a body member connected between said upper and lower housings and having an opening therein connecting the interior of the lower housing to the interior of the upper housing, a first vertical lever extending through said opening, a sealing diaphragm having an outer portion clamped between the body member and the lower housing and having an inner portion secured to said first lever, means responsive to a process variable for transmitting movements to the lower end of said first lever in order to rock said first lever about said diaphragm, a horizontal beam connected to the upper end of said first lever, a pair of flexible strips each secured at its upper end to said beam, means on said body member supporting each of said strips at its lower end for movement about a point disposed vertically below said outer portion of said diaphragm, a first link secured to said beam, first and second flexible spring elements extending parallel to each other and connected together at one end, means connecting the other end of the first element to said first link, means for securing the other end of the second element to said body member, a second link connected to the first link, a force balance unit including a balance beam and also including a casing disposed within said upper housing, a second vertical lever pivotally mounted on said casing and connected at its lower end to said second link, a load spring connected between the upper end of said second lever and said balance beam, a bracket supporting the balance unit casing upon said body member, means for adjusting the position of said bracket and said balance unit casing in order to vary the force transmitted to said balance beam through said spring, and an adjustable clamp movable along both of said elements for providing a span adjustment for altering the range of movement of the second lever in response to a predetermined range of movement of the first lever.

3. A transmitter for process control systems comprising a lower housing, an upper housing, a body member connected between said upper and lower housings and having an opening therein connecting the interior of the lower housing to the interior of the upper housing, a first vertical lever extending through said opening, a sealing diaphragm having an outer portion clamped between the body member and the lower housing and having an inner portion secured to said first lever, means responsive to a process variable for transmitting movements to the lower end of said first lever in order to rock said first lever about said diaphragm, a beam connected to the upper end of said first lever, a pair of flexible strips each secured at its upper end to said beam, means on said body member supporting each of said strips at its lower end for movement about points disposed vertically below said outer portion of said diaphragm, a first link secured to said beam, first and second flexible spring elements extending parallel to each other and connected together at one end, means connecting the other end of the first element to said first link, means for securing the other end of the second element to said body member, a second link connected to the first link, a force balance unit including a balance beam, a second vertical lever for transmitting forces to said balance beam and connected at its lower end to said second link, means for adjusting the position of the second link with respect to the first link in order to alter the position of the second lever and, hence, to vary the force transmitted to the balance beam, and an adjustable clamp movable along both of said elements for providing a span adjustment for altering the range of movement of the second lever in response to a predetermined range of movement of the first lever.

4. In a transmitter for producing electrical signals corresponding to a process variable; a motion transmitting mechanism for transmitting movements corresponding to said process variable fixed support means for said motion transmitting mechanism; a force balance unit connected to said motion transmitting mechanism and responsive to the transmitted movements for developing said electrical signals; and means in said motion transmitting mechanism for adjusting the range of signals developed by said force balance unit in response to variations of said process variable between predetermined limits; said last named means including a pair of interconnected range springs, means mounting one of said springs upon said fixed support means; means in said motion transmitting mechanism connecting the other of said range springs to the force balance unit, and adjustable clamping means slideable along both of said range springs to vary the motion transmitted to said force balance unit.

5. In a transmitter for producing electrical signals corresponding to a process variable in response to movements transmitted to the balance beam of a force balance unit via a motion transmitting mechanism of the type including a lever mounted for pivotal movement upon a fixed support means, a new and improved range adjusting mechanism in the motion transmitting mechanism for adjusting the range of signals developed by said force balance unit in response to variations of said process variable between predetermined limits, said range adjusting mechanism including a folded cantilever spring formed by a pair of side by side elongated range springs connected together at one end, means fixedly mounting the other end of one of the springs upon the fixed support means, means including a first link arm connecting the other end of the other range spring to the lever, means including a second link adjustable with respect to the first link for connecting the balance beam to said other end of said other range spring, and an adjustable clamp manually slideable along both of said range springs and effective to clamp said springs together in order to vary the effective length of said folded spring and, hence, to alter the forces transmitted to said force balance unit.

6. In a transmitter for producing electrical signals corresponding to a process variable in response to movements transmitted to the balance beam of a force balance unit via a motion transmitting mechanism of the type including a lever mounted for pivotal movement upon a fixed support means, a new and improved range adjusting mechanism in the motion transmitting mechanism for adjusting the range of signals developed by said force balance unit in response to variations of said process variable between predetermined limits, said range adjusting mechanism including a folded cantilever spring fixedly mounted at one end upon the fixed support means, means including a first link arm connecting the other end of the other spring to the lever, means including a second link arm adjustable with respect to the first arm for connecting the balance beam to said other end of said other range spring, and an adjustable clamp manually slideable along said folded spring to vary its effective length and, hence, to alter the forces transmitted to the balance beam.

7. In a transmitter for producing signals corresponding to a process variable in response to movements transmitted to the balance beam of a force balance unit via a motion transmitting mechanism, the improvement which comprises an outer housing for the motion transmitting mechanism, a sealed, explosion proof inner housing enclosing the force balance unit and disposed within said outer housing, and means for transmitting the movements of the motion transmitting mechanism through the sealed inner housing to the balance beam of the force balance unit, the last named means including a lever mounted for pivotal movement upon the inner housing by an annular diaphragm having its outer rim secured to the housing and its inner edge secured to the lever.

8. In a transmitter for producing signals corresponding to a process variable in response to movements transmitted to a force balance unit via a motion transmitting mechanism, the improvement which comprises an outer housing for the motion transmitting mechanism, a sealed inner housing enclosing the force balance unit and disposed within said outer housing, and means for transmitting the movements of the motion transmitting mechanism through the sealed housing to the force balance unit.

9. In a transmitter for producing an output corresponding to a process variable in response to movements transmitted via a motion transmitting mechanism to a force balance unit of the type employing a balance beam connected to the motion transmitting mechanism through a load spring, the improvement which comprises a casing supporting the motion transmitting mechanism, a housing for the balance unit, and support structure mounting the balance unit housing for tilting movement with respect to said casing in order to vary the force transmitted to said balance beam through said spring, thereby to provide a zero adjustment.

10. In a transmitter for producing an output corresponding to a process variable in response to movements transmitted via a motion transmitting mechanism to a force balance unit of the type employing a balance beam connected to the motion transmitting mechanism through a load spring, the improvement which comprises a casing supporting the motion transmitting mechanism, a housing for the balance unit, a bracket supporting the balance unit housing, means securing the bracket to the casing, and adjustable means for pivoting the bracket about the securing means in order to tilt the housing with respect to the casing, thereby varying the force transmitted to said balance beam through said spring to provide a zero adjustment.

11. The apparatus defined by claim 10 wherein the adjustable means includes a member having a pair of threaded regions of different pitch, one of said regions being threaded into said bracket and the other of said regions being threaded into the casing whereby said bracket is pivoted about said securing means when said member is turned.

12. In a transmitter for producing an output corresponding to a process variable in response to movements transmitted via a motion transmitting mechanism to a force balance unit of the type employing a balance beam connected to the motion transmitting mechanism, the improvement which comprises a casing supporting the motion transmitting mechanism, a housing for the balance unit, and support structure mounting the balance unit housing for tilting movement with respect to said casing in order to vary the force transmittted to said balance beam to provide a zero adjustment.

13. In a transmitter for producing an output corresponding to a process variable in response to movements transmitted via a motion transmitting mechanism to a force balance unit of the type employing a balance beam connected to the motion transmitting mechanism through a load spring, the improvement which comprises a casing supporting the motion transmitting mechanism, a housing for the balance unit, a bracket having a base portion carrying said housing and also having at least one foot portion secured to the casing, and adjustable means for tilting said bracket about said foot portion in order to vary the force transmitted to said balance beam through said spring, thereby to provide a zero adjustment.

14. The apparatus defined by claim 13 wherein the adjustable means includes a member having a pair of threaded regions of different pitch, one of said regions being threaded into said bracket and the other of said regions being threaded into the casing whereby said bracket is pivoted about said foot portion when said member is turned.

15. In a transmitter for producing electrical signals corresponding to a process variable in response to movements transmitted to a force balance unit via a motion transmitting mechanism mounted upon a fixed support means, a new and improved range adjusting mechanism in the motion transmitting mechanism for adjusting the range of signals developed by said force balance unit in response to variations of said process variable between predetermined limits, said range adjusting mechanism including a folded cantilever spring mounted upon the fixed support means, and adjustable clamping means manually slideable along said spring to vary the effective length of said spring and, hence, to alter the forces transmitted to said force balance unit.

16. In a transmitter for producing electrical signals corresponding to a process variable in response to movements transmitted to a force balance unit via a motion transmitting mechanism mounted upon a fixed support means, a new and improved range adjusting mechanism in the motion transmitting mechanism for adjusting the range of signals developed by said force balance unit in response to variations of said process variable between predetermined limits, said range adjusting mechanism including a pair of springs interconnected at one end, means mounting the opposite end of one of the springs upon the fixed support means, the opposite end of the other spring being connected to the force balance unit, and adjustable clamping means manually slideable along both of said springs to vary the effective length of said springs and, hence, to alter the forces transmittted to said force balance unit.

17. In a transmitter for producing electrical signals corresponding to a process variable in response to movements transmitted to a force balance unit via a motion transmitting mechanism mounted upon a fixed support means, a new and improved range adjusting mechanism in the motion transmitting mechanism for adjusting the range of signals developed by said force balance unit in response to variations of said process variable between predetermined limits, said range adjusting mechanism including a folded cantilever spring formed by a pair of side by side elongated range springs connected together at one end, means fixedly mounting the other end of one of the springs upon the fixed support means with the other end of the other spring being connected to the motion transmitting mechanism, and an adjustable clamp manually slideable along both of said range springs and effective to clamp said springs together in order to vary the effective length of said folded spring and, hence, to alter the forces transmitted to said force balance unit.

References Cited in the file of this patent

UNITED STATES PATENTS

| | | |
|---|---|---|
| Re. 24,267 | Ostermann et al. | Jan. 22, 1957 |
| 2,138,937 | Petroe | Dec. 6, 1938 |
| 2,178,471 | De Bruin | Oct. 31, 1939 |
| 2,431,200 | Rosenberger | Nov. 18, 1947 |
| 2,539,892 | Cook | Jan. 30, 1951 |
| 2,614,163 | Roper | Oct. 14, 1952 |
| 2,659,390 | MacLea et al. | Nov. 19, 1953 |
| 2,702,381 | Roper | Feb. 15, 1955 |
| 2,761,471 | Cook | Sept. 4, 1956 |
| 2,762,394 | Hastings | Sept. 11, 1956 |
| 2,779,197 | Embree | Jan. 29, 1957 |
| 2,806,480 | Bowditch | Sept. 17, 1957 |
| 2,808,725 | Booth et al. | Oct. 8, 1957 |
| 2,867,123 | Kmiecik | Jan. 6, 1959 |